Feb. 14, 1961  C. O. GLASGOW ET AL  2,971,376
METERING EMULSION TREATERS AND TREATING METHODS
Filed Oct. 7, 1957  5 Sheets-Sheet 1

Fig.1

INVENTORS
Clarence O. Glasgow
Knox B. Henderson
BY
Ashley & Ashley
ATTORNEYS

INVENTORS
Clarence O. Glasgow
Knox B. Henderson
BY
Ashley & Ashley
ATTORNEYS

Feb. 14, 1961  C. O. GLASGOW ET AL  2,971,376
METERING EMULSION TREATERS AND TREATING METHODS
Filed Oct. 7, 1957  5 Sheets-Sheet 4

INVENTORS
Clarence O. Glasgow
Knox B. Henderson

BY *Ashley & Ashley*

ATTORNEYS

Fig. 10

United States Patent Office 2,971,376
Patented Feb. 14, 1961

2,971,376

METERING EMULSION TREATERS AND TREATING METHODS

Clarence O. Glasgow and Knox B. Henderson, Tulsa, Okla., assignors to National Tank Company, Tulsa, Okla., a corporation of Nevada Filed Oct. 7, 1957, Ser. No. 688,571

17 Claims. (Cl. 73—200)

This invention relates to new and useful improvements in metering emulsion treaters and treating methods.

In particular, the invention is concerned with emulsion treaters for treating petroleum well streams and resolving the same into their oil, water, and gas components, and having provision for accurately and automatically measuring the volume of oil, water, and gas so separated.

Many petroleum wells produce flow streams containing gas, oil, some free water, and an emulsion of oil and water, usually a water in oil emulsion although oil in water emulsions are not to be considered rare occurrences. Of course, the gas must be effectively separated and removed from the well stream, and the oil content of the stream recovered as clean oil containing less than a very small amount or trace of water before the oil is salable. It has been the practice in the past to employ emulsion-treating chemicals and emulsion-treating units of various types in order to break the oil and water emulsion and resolve the liquid portions of the well stream into clean marketable oil, and into water, usually salt water, from which substantially all oil has been removed to avoid wastage as well as possible pollution of the well or locality in which disposed of the water is made. The owner or operator of the well is always interested in determining how much gas, oil, and water the well is producing from day to day, and further, royalties are usually paid on the basis of the quantity of oil produced and for this reason also the quantity of salable oil must be known.

It has been the practice in many instances to utilize various types of metering devices through which the fluids may be passed for measurement, but such devices are often relatively inaccurate, do not of themselves function as emulsion treaters, and do not lend themselves to permanent installation so that a continuous check of production volumes may be maintained. As a result, it is often necessary to provide a separate group of storage tanks or vessels for each producing well so that the volumes of oil received in the storage vessels may be measured from time to time and the rate of production of the well determined. In some cases, a group of wells may be produced into a single group of storage tanks if royalties are to be paid to a single royalty owner, but in such cases, the continuing check of production volumes, which is of considerable value and benefit to the operator, is not obtained unless metering equipment of some type is periodically brought to the wells for checking of the production rates.

It is therefore, one object of this invention to provide an improved metering emulsion treater having provision for the proper and effective resolution of petroleum emulsion streams into their water and oil components, and also having provision for automatically and continuously measuring and recording the volume of the several well fluids which are produced, or any selected one or more of such fluids.

Yet another object of the invention is to provide an improved metering emulsion treater and treating methods in which cooler portions of the well stream or portions thereof are utilized repeatedly for condensation of light hydrocarbon vapors which may be evolved from the recovered oil in order that a maximum volume of oil be retained as well as oil of the highest gravity and hence the greatest market value.

An additional object of the invention is to provide an improved metering emulsion treater having large surge chambers for the separated water and clean oil from which metering chambers may be alternately filled and emptied without appreciable disturbance of the oil-water interface within the stratification chamber of the emulsion treater.

Still another object of the invention is to provide an improved metering emulsion treater in which the emulsion treating steps may be carried out at any desired pressure and the clean oil discharged under such pressure, but wherein provision is made for metering or measuring the volume of the clean oil at a lower pressure which may be at or near atmospheric pressure whereby more accurate measuring is obtained and the clean oil is to some extent stabilized or freed of unretainable gaseous fractions dissolved therein.

A still further object of the invention is to provide an improved metering emulsion treater having provision for condensing vapors arising from the oil metering chamber and preventing the entry of such condensates into the water metering chamber.

Yet another object of the invention is to provide an improved metering emulsion treater utilizing a combined heat exchanger and surge chamber for accumulating separated oil during the metering chamber discharge cycle and thus avoiding-undesirable variations in the elevation of the oil-water interface within the stratifying chamber of the emulsion treater, and also affording ample opportunity for heat exchange between the relatively warm recovered clean oil and the relatively cool incoming well stream.

Other and more particular objects will be obvious and apparent from a reading of the following specification and description of operation.

A construction designed to carry out the invention will be hereinafter described, together with other features of the invention.

The invention will be more readily understood from a reading of the following specification and by reference to the accompanying drawings, wherein examples of the invention are shown, and wherein:

Fig. 2 is a vertical, sectional view taken upon the line 2—2 of Fig. 1, Figs. 3 and 4 are horizontal, cross-sectional views taken upon the respective lines of Fig. 1.

This application is directed to subject-matter related to the subject-matter disclosed in the copending application of Knox B. Henderson and James O. Brown, Serial No. 688,867, filed October 8, 1957 and the copending application of Jay P. Walker and Clarence O. Glasgow, Serial No. 716,968, filed February 24, 1958, both of common ownership with the present application, and reference is made thereto.

Figure 1:
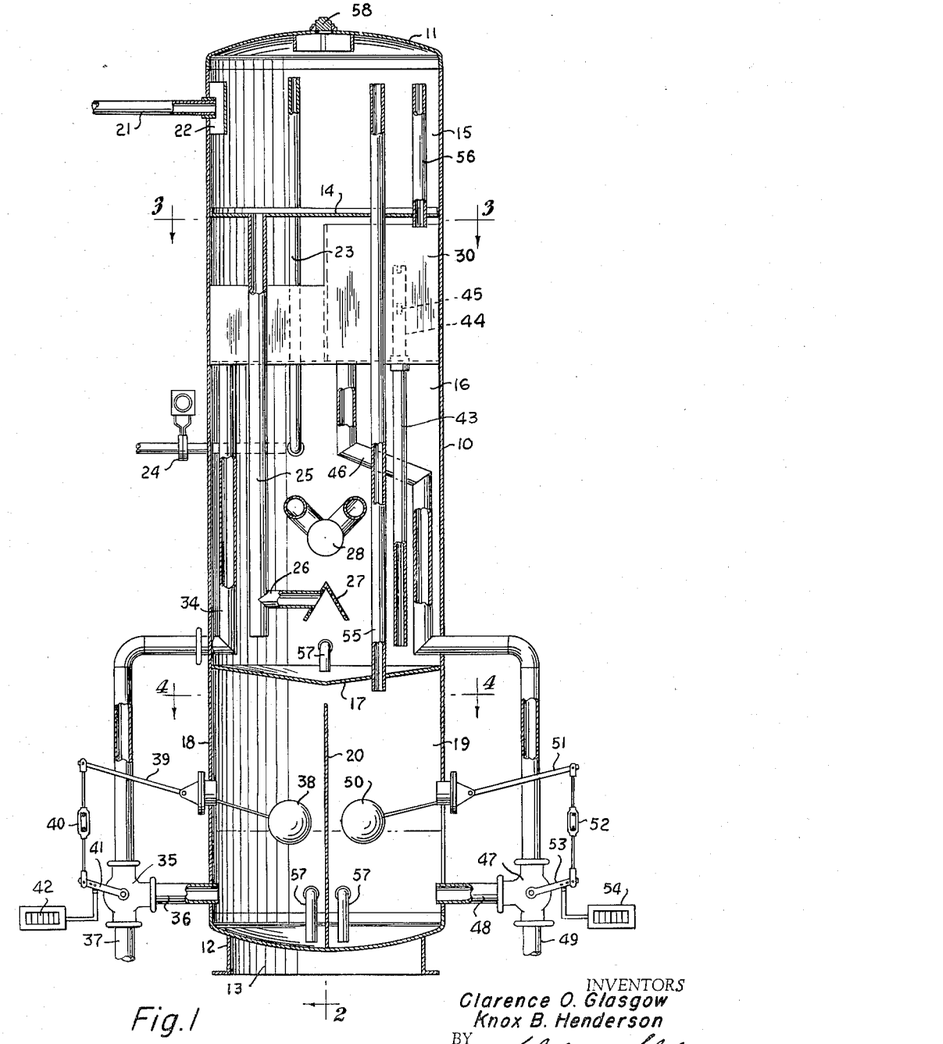
Fig. 1 is a vertical, sectional view of an emulsion treater constructed in accordance with this invention and adapted to carry out the methods thereof.

In the drawings, the numeral 10 designates an upright, cylindrical emulsion treater vessel having a domed head 11 and a dished bottom 12 carried upon a suitable support member 13. A transverse partition 14 in the upper portion of the vessel 10 encloses a preliminary gas separation chamber 15 in the uppermost portion of the vessel and forms the upper wall of a heating and stratification chamber 16 in the intermediate portion of the vessel. The bottom of the heating and stratification chamber comprises a transverse partition 17 which forms the upper wall of an oil metering chamber 18 and a water metering chamber 19 in the lowermost portion of the vessel 10, the chambers 18 and 19 being separated by a medial, upright partition 20 extending upwardly from the bottom 12 of the vessel and terminating a short distance below the partitions 17 to afford pressural and gas equalization between the two metering chambers.

A well stream inlet conductor 21 opens into the chamber 15 through a side wall thereof and directs the incoming well stream into a diverter box 22 which deflects the well stream into a circumferential or tangential path around the side walls of the chamber 15 to separate and scrub gas from the well stream in the usual manner. The separated gas is removed through a gas outlet conductor 23 extending downwardly from the chamber 15 into the chamber 16 and thence exteriorly of the vessel 10 to a suitable gas metering or measuring device 24 which may be of any usual or desirable type. The separated liquids flow downwardly onto the upper surface of the partition 14 and are drained therefrom through a flume 25 extending downwardly into the chamber 16 and terminating a short distance above the partition 17 in a lateral branch 26 opening into a perforated spreader unit 27.

Some free water may be present in the well stream, and some of the portions of the looser emulsion may have separated into water and oil in the course of passing through the chamber 15 and as a result of the slight degree of warming which occurs as the well stream passes downwardly through the flume 25. This free water will immediately flow toward the partition 17 while the remaining oil and emulsion is divided by the spreader unit 27 into a multiplicity of small streams moving generally upwardly into adjacency with a heating unit 28 extending transversely of the chamber 16 above the spreader 27. Any suitable or desirable type of heating means may be employed such as steam coils or bundles, direct fired fire-tubes, indirect heaters, electrical heaters, and the like. The type of heating unit employed is not critical, nor is the elevation at which the oil-water interface is carried. The heating unit is desirably completely immersed in liquid, especially if a direct fired type of unit is employed, but this liquid may be water, oil, or a mixture of oil and emulsion.

The remaining well fluids are heated to the necessary or desirable treating temperature by the heating unit 28, such temperatures usually ranging from 100 degrees Fahrenheit to 180 degrees Fahrenheit, depending upon the type of emulsion being handled and other characteristics of the well stream. The heating results in the breaking or resolving of the remaining emulsion into its water and clean oil components, the clean or water-free oil, of course, moving upwardly within the stratification chamber 16 due to its lighter weight or density, while the water tends to move toward the lower portion of the chamber. The relatively large and unobstructed interior of the chamber 16 provides ample stratification and settling space for separation of the emulsion into its components, there being included at any desirable or suitable elevation within the chamber 16 a filtering section (not shown) of straw, wood excelsior, or the like, as is usual in emulsion treaters of this type.

Figures 2, 3, 4:
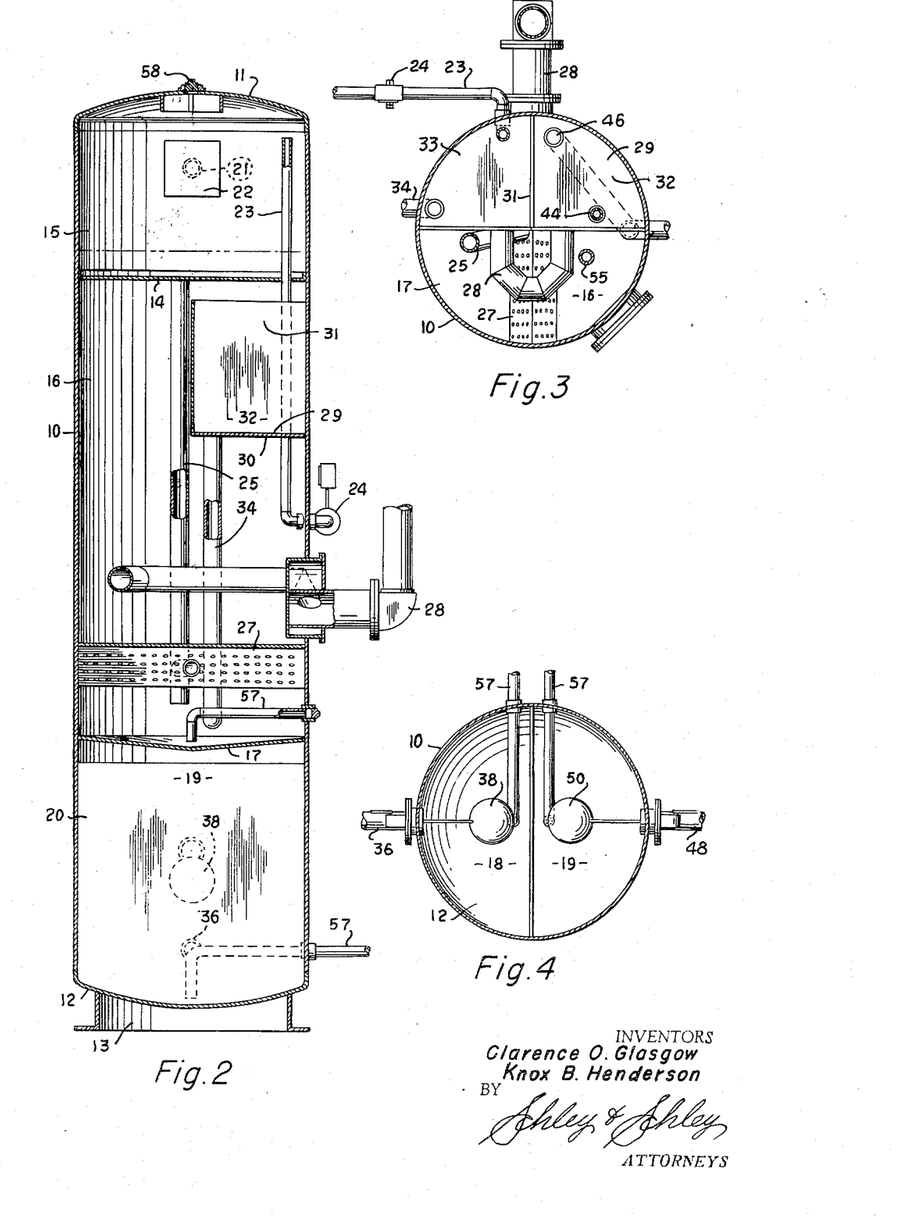
Figure 6:
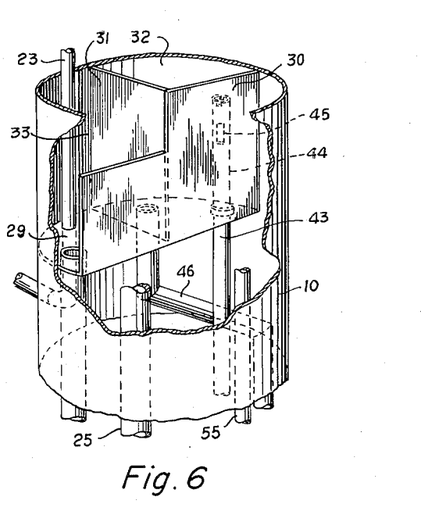
Fig. 6 is a fragmentary view in perspective of the surge box section of the treater illustrated in Fig. 1.

In the upper portion of the stratification chamber 16, there is provided a semi-partition 29 extending approximately half-way across the upper portion of the chamber as illustrated in Figs. 3 and 6, and having a vertical, stepped partition 30 extending upwardly from its free edge. A second vertical partition 31 bisects the horizontal partition 29 extending between the wall of the vessel 10 and the partition 30 so as to form with the partitions 29 and 30 a water surge chamber 32 and an oil surge chamber 33. The partition 31 and that portion of the partition 30 adjoining the water surge chamber or box 32 extend to a point closely beneath the partition 14, while the portion of the partition 30 enclosing the oil surge chamber or box 33 has its upper edge spaced some distance below the partition 14 to form a weir over which clean oil may be skimmed from the interior of the chamber 16 into the oil surge box 33. Clean oil is removed or drained from the box through a downwardly extending conductor 34 which passes through the wall of the vessel 10 near the bottom of the chamber 16 and continues downwardly exteriorly of the vessel to a three-way valve 35. One outlet branch 36 of the valve 35 is connected into the lower portion of the oil metering chamber 18, while the other branch 37 of the valve 35 leads to storage vessels or other point of delivery for the metered clean oil.

A float 38 disposed within the chamber 18 has its actuating arm 39 connected by a link 40 to the operating arm 41 of the valve 35, and a suitable counting mechanism 42 is also connected to the arm 41. Thus, when the float 38 is in its lower position within the chamber 18, it shifts the valve 35 to place the conductors 34 and 36 in communication for filling of the chamber 18. As the float 38 reaches the upper end of its path of travel, it switches the valve 35 to place the conductors 36 and 37 in communication, while closing off the conductor 34, so that the measured quantity of oil present within the chamber 18 may drain therefrom. Of course, the counter 42 is actuated each time the valve 35 is shifted in one direction and accordingly maintains a record of the number of times the metering chamber 18 has been filled and emptied. As the chamber 18 may be carefully calibrated to determine the volume of liquid discharged each time the chamber is filled and emptied, a knowledge of the number of fillings and emptyings obtained from the counter 42 will provide the operator with an accurate and automatically maintained record of the volume of clean oil discharged from the treater.

For discharging separated water from the stratification chamber 16, a water leg pipe 43 extends upwardly from a point near the bottom of the chamber into the water surge box 32, terminating in an adjustable overflow nipple 44 having therein a water outlet port or window 45. A water drain conductor 46 leads from the bottom of the box 32 outwardly through the wall of the vessel 10 to a three-way valve 47 having one outlet 48 connected into the bottom of the water metering chamber 19, and its second outlet 49 leading to a point of water disposal. A float 50 within the chamber 19 actuates its float arm 51 to shift the valve 37 through a link 52 connected to the operating arm 53 of the valve. Again, a suitable counter 54 is also connected to the arm 53 for recording the number of times the chamber 19 is filled and emptied.

The operation of the water metering chamber is substantially the same as that of the oil metering chamber, the water in the lower portion of the stratification chamber 16 flowing upwardly through the water leg pipe 43 because of the hydrostatic pressure present thereon into the box 32 and thence downwardly through the pipe 46 and the valve 47 into the chamber 19. When the chamber has been filled with its predetermined volume of separated water, the valve 47 is shifted by the float 50 to close off the conductor 46 and place the conductors 48 and 49 in communication for draining of the measured volume of water from the chamber 19.

The flow throughout the interior of the emulsion treater is carried out by gravity, the discharge of metered liquids from the treater being carried out by gravity coupled with whatever pressure may be maintained within the treating vessel which normally may be from a few pounds to as much as 50 or more pounds per square inch. Of course, the pressures within the chambers 18 and 19 are equalized through the gap between the upper edge of the partition 20 and the partition 17, a gas equalizer conductor 55 extending from the metering chambers upwardly into the preliminary gas separation, and a second gas equalizing conductor 56 extending upwardly into the chamber 16. Suitable drain or cleanout pipes 57 are provided for the bottoms of the chambers 16, 18 and 19. An alternate gas outlet fitting 58 is provided in the head 11 for utilization when desired in place of the gas outlet conductor 23.

In the operation of the metering emulsion treater illustrated in Fig. 1, the well stream enters the chamber 15 through the inlet conductor 21 as previously described for removal of the major portion of the gas content of the well stream, the separated liquids flowing downwardly into the chamber 16 for heating and retention in the chamber for efficient and complete stratification into water and clean oil layers. The oil is skimmed or overflows into the oil surge chamber or box 33 for passage downwardly into the oil metering chamber 18 while water is accumulated in the chamber 32 for subsequent measurement in the chamber 19. The chambers 18 and 19 alternately fill and empty in accordance with the rate of oil and water production and a continuous and accurate record of the volume of water and oil produced is maintained by the counters 42 and 54. During the time either of the chambers 18 or 19 is emptying, discharge of liquids from the boxes 32 and 33 is temporarily halted, and unless adequate provision were otherwise made, accumulation of the oil and/or water in the stratification chamber 16 might have an adverse or harmful effect upon the elevation of the oil-water interface within the stratification chamber. The provision and utilization of the surge boxes 32 and 33, however, allows the temporary storing or retention of quantities of separated oil and water within the boxes, and until the latter become full, no effect upon the interface level will be encountered. Accordingly, the liquids within the chamber 16 are protected from the effect of the intermittent flow necessarily occurring into and from the chambers 18 and 19, and stable and effective operating conditions are maintained.

It is to be noted that the heating of the well fluids within the chamber 16 results in the evolution of quantities of condensible hydrocarbons, and the loss of these vapors would result in a diminishing of the volume of clean oil recovered as well as a lowering of the gravity of the oil and therefore its marketable value. The partition 14 is constantly exposed to the inflowing well stream and hence is maintained at a relatively cool temperature with respect to the liquids present in the chamber 16, and accordingly, functions as a condensing surface upon which the vaporized hydrocarbons may be returned to the liquid state for ultimate recovery. Further, the liquids present in the chamber 16 immediately above the partition 17 are also relatively cool, and vapors arising from the warm oil passing into and out of the chamber 18 may likewise be condensed upon the under side of the partition 17 for liquefaction and recovery. Thus, the treater provides two condensing surfaces maintained at relatively cool temperatures as compared to the temperature of the clean oil discharged from the chamber 16, and very effective condensation and recovery of vaporized hydrocarbons is achieved. The treater not only combines into a single unit an effective and efficient emulsion treating structure, along with means for accurately measuring and recording the volumes of clean oil and water which may be discharged, but also carries out a two-stage condensation of vaporized components for optimum recovery of those lighter hydrocarbons which may be retained in conventional storage vessels.

It is further to be noted that the condensing of hydrocarbon vapors on either or both of the partitions 14 and 17, combined with the initial evolution of such vapors due to the heating of the emulsion stream, result in a more accurate measuring or metering of the oil and water, especially the clean oil. If the well stream is not heated, there may be present in the metered oil considerable quantities of dissolved gas which would increase the volume of the oil and be measured as a liquid in the oil metering chamber, but such gases would most likely be released from the oil in the storage tanks to which the oil is conducted, and accordingly, an incorrect indication of the volume of oil being produced would necessarily result. On the other hand, since the heating of the well stream causes not only the evolution of gas but also the evolution of condensible hydrocarbon vapors, failure to condense and retain these vapors would reduce the volume of the oil recovered, as well as impair its gravity, and there would result a wasting of the lighter and valuable hydrocarbon fractions. The combination of the heating of the well stream along with one or more condensing steps thus affords maximum recovery of petroleum fluids with optimum accuracy of measurement.

It is also pointed out that the heating of the fluids within the treating vessel enhances the accuracy of fluid measurement and insures greater freedom from operational difficulties in that separated water is protected from freezing in cold weather localities, and equally important, the separated oil and the well fluids are maintained at temperatures sufficient to prevent the deposit of paraffin on the vessel walls. This is particularly beneficial with respect to the clean oil metering chamber since the solidification of paraffin in this chamber not only might impair the functioning of the float and valve arrangements, but also would cause a change in the internal volume of this chamber so as to give rise to metering inaccuracy. Thus, the heating of the fluids preserves the initial calibration of the clean oil metering chamber and insures more accurate and consistent metering operations.

In use, the structure may be moved to the location of a new well which has been completed for proper treating and resolving of any emulsion which may be produced along with accurate measuring of the gas, water, and oil produced by the well over a period of days or for considerably longer times. On the other hand, the unit may be installed for a well or a group of wells as a permanent unit so that a continuous record of the production of the well or wells is maintained as well as assurance of proper and complete emulsion treating.

Figure 5:
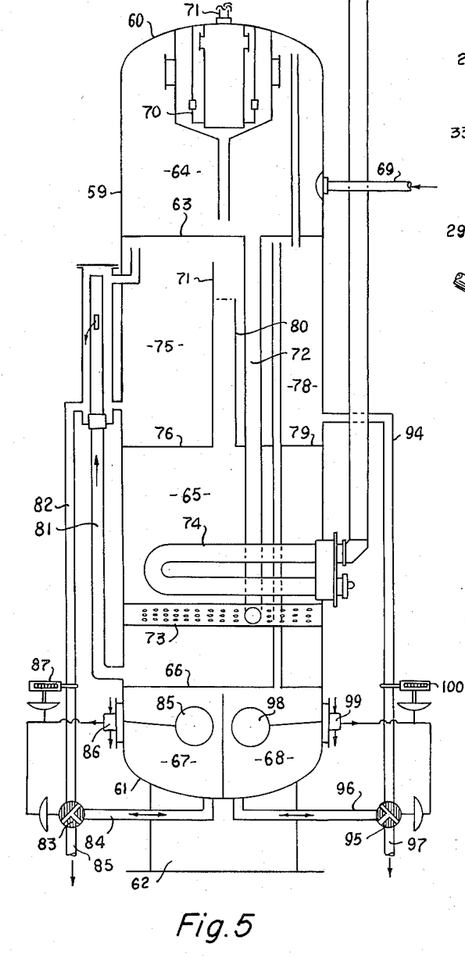
Fig. 5 is a vertical, sectional, schematic view of a modified form of the invention.

A second, somewhat similar form of the invention is shown in Fig. 5 and includes an upright vessel 59 having a domed head 60 and a dished bottom 61 carried upon a base of support 62. A transverse partition 63 in the upper portion of the vessel forms the bottom of a preliminary gas separation chamber 64 and the upper wall of a heating and stratification chamber 65. A second partition 66 in the lower portion of the vessel forms the bottom of the chamber 65 and the upper walls of a water metering chamber 67 and an oil metering chamber 68. A well stream inlet conductor 69 opens into the side wall of the chamber 64 upon the walls of which the well stream is scrubbed for gas removal and some degree of water and oil separation. The gas is removed through a mist extractor 70 in the upper portion of the chamber 64 and a gas outlet conductor 71 opening upwardly through the head 60.

The separated liquids drain downwardly from the chamber 64 through a flume 72 extending vertically within the stratification chamber 65 and terminating at its lower end in a perforated spreader plate 73. A heating unit 74 of any suitable type is positioned in the stratification chamber above the spreader 73 for heating the well fluids to adequate and proper emulsion breaking temperatures. Above the heating unit in the upper portion of the chamber 65, there is provided a water surge chamber or box 75 formed by a transverse bottom partition 76 extending slightly less than one-half of the distance across the stratification chamber and being joined by an upright wall or partition 77 extending upwardly to a point adjacent the under side of the partition 63. There is also provided an oil accumulation or surge box 78 formed by a transverse partition 79 extending from the opposite wall of the vessel 59 to a point adjacent the free edge of the partition 76 and also having a vertical plate or partition 80 extending upwardly toward the partition 63 but terminating below the upper edge of the partition 77 whereby clean oil may skim over the upper edge of the partition 80 into the box 78. An external water leg structure 81 extends from the lower portion of the stratification chamber upwardly for connection into the water surge box 75, so that separated water may flow upwardly through the water leg 81 for entry into and temporary retention in the water surge box 75. It is to be noted that the boxes 75 and 78 occupy the major portion of the cross-sectional area or volume of the upper portion of the stratification, only sufficient free space being left for vertical flow of the clean oil to be skimmed over the upper edge of the partition 80. Thus, quite considerable quantities of clean oil and water may be accumulated and temporarily retained within the surge boxes in order to assure a stable and reasonably constant elevation for the oil-water interface within the stratification chamber as the metering chambers are filled and emptied.

Figure 7:
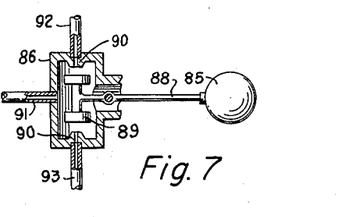
Fig. 7 is a fragmentary, sectional view of one of the float pilot valves.

Separated water is withdrawn from the surge box 75 through the upper portion of the water leg structure into a pipe 82 leading downwardly to a motor or diaphragm-operated three-way valve 83. One outlet conductor 84 of the valve 83 is connected into the bottom of the water metering chamber 67, while the other outlet conductor 85 of the valve is directed to a point of water discharge or disposal. A float 85 within the metering chamber 67 operates a conventional pilot gas valve 86 which, in turn, operates the three-way valve 83 and a diaphragm-operated counter 87. The pilot valve may be of any suitable or desirable structure, a simplified illustration of this type of valve being shown in Fig. 7 in which the float 85 through its lever arm 88 operates a double-faced valve element 89 adapted to engage alternately valve seats 90 leading to a source of pilot gas under pressure and a point of venting such gas. A third conductor 91 leads from the valve 86 to the diaphragms of the valve 83 and the counter 87. As indicated in Fig. 5, pilot gas under pressure is supplied through the upper conductor 92 to the upper valve seat 90, the lower valve seat communicating with a vent conductor 93. Thus, when the chamber 67 is filled with water and the float 85 elevated, the vent conductor 93 is shut off and the pilot gas conductor 92 placed in pressural communication with the conductor 91 for actuation of the valve 83 and the counter 87. In most instances, it is preferred to utilize pilot valves of this type which function with a snap action so that the valve element 89 is always in engagement with one or the other of the valve seats and moves very quickly and almost instantaneously from one seat to another as the float 85 is raised or lowered. As described in connection with the first form of the invention, the raising and lowering of the float 85 within the chamber 67 as the chamber fills and empties results in switching of the valve 83 to permit filling of the metering chamber 67 from the surge box 75, followed by emptying of a calibrated and predetermined quantity of water from the metering chamber with the emptying and filling cycles being recorded upon the counter 87.

The clean oil is drained from the surge box 78 through an outlet pipe 94 leading downwardly to a three-way valve 95 having one outlet 96 connected into the bottom of the oil metering chamber 68 and its other outlet 97 extending to storage vessels or other point of use or retention of the clean oil. A float 98 within the chamber 68 operates a pilot valve 99 similar in all respects to the pilot valve 86, the pilot valve, in turn, actuating the three-way valve 95 and a counting mechanism 100. Obviously, the operation of the oil metering chamber is substantially identical to that of the water metering chamber.

Figure 8:
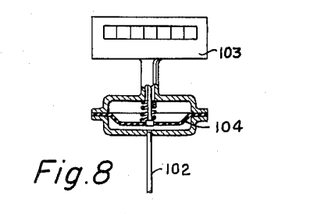
Fig. 8 is a view partly in elevation and partly in section illustrating the pneumatically operated counting structure.

Any suitable or desirable type of counting mechanism may be employed, a suitable unit being shown schematically in Fig. 8 in which a diaphragm 101 responds to pressure surges supplied through the conductor 102 to move upwardly and advance the conventional counting mechanism 103 one unit to indicate one filling and emptying of the metering chamber. Obviously, any other suitable type of counting device, either mechanical, pneumatic, or electrical, may be employed if so desired.

The operation of this modified form of the invention is substantially the same as that shown in Figs. 1 and 2 of the drawings, the primary difference being found in the utilization of the external water leg structure and the surge boxes 75 and 78 of quite considerably increased volume. Thus, it is made even more certain that the elevation of the interface level within the stabilization chamber 65 will be maintained relatively constant, and efficient, turbulent-free stratification and separation of oil and water in the chamber carried out.

Figure 9:
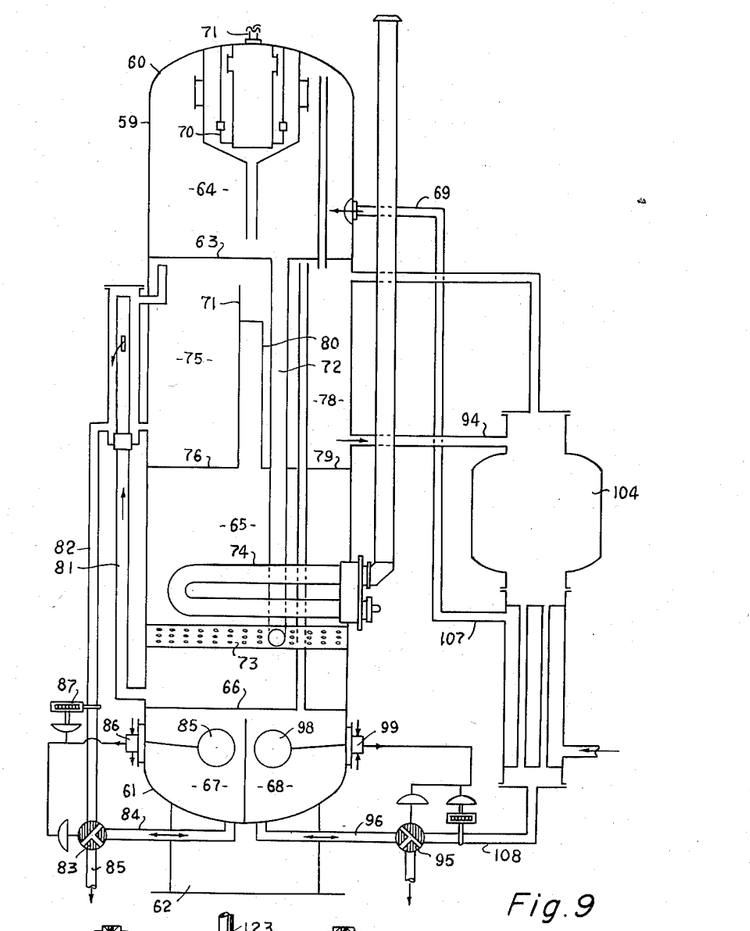
Fig. 9 is a vertical, sectional view of a further modification of the invention.

Either of the forms of the invention described hereinabove may be further modified as illustrated in Fig. 9 to include an external heat exchanger and surge chamber through which the well stream is admitted for preheating by indirect heat exchange with the clean oil passing to the oil metering chamber. As shown in Fig. 9, the heat exchanger structure may include an upright enclosure 104 of considerable internal volume and having a tube and shell heat exchanger 105 in its lower portion. The well stream is admitted to the shell side of the heat exchanger through an inlet conductor 106 and passes upwardly therethrough to an outlet conductor 107 connected with the inlet conductor 69 of the emulsion treater illustrated in Fig. 5. The clean oil oulet conductor 94 is connected into the upper end of the enclosure 104 for passing clean oil downwardly through the tube side of the heat exchanger 105, the cooled clean oil leaving the lower end of the enclosure 104 through a conductor 108 connected to the inlet of the three-way valve 95. In similar fashion, to incorporate this modification into the form of the invention shown in Fig. 1, the conductor 107 may be joined to the well stream inlet conductor 21, the clean oil outlet conductor 46 connected to the upper end of the enclosure 104, and the lower end of the enclosure connected to the three-way oil valve 47.

This further modification of the invention provides additional surge and accumulation space for the separated clean oil, permitting the reducing or substantial elimination of the clean oil accumulation or surge box, or functioning to supplement the accumulation space afforded thereby. In addition, the clean oil is passed in indirect, counter-current heat exchange with the incoming well stream whereby the well stream is preheated before entry into the preliminary gas separation chamber for more effective evolution of gas and the breaking of looser portions of the emulsion, while desirable cooling is imparted to the clean oil for more accurate measurement thereof as well as retention of volatile hydrocarbons and ultimate delivery of the metered clean oil to storage vessels at temperatures approximating storage temperatures.

Figure 10:
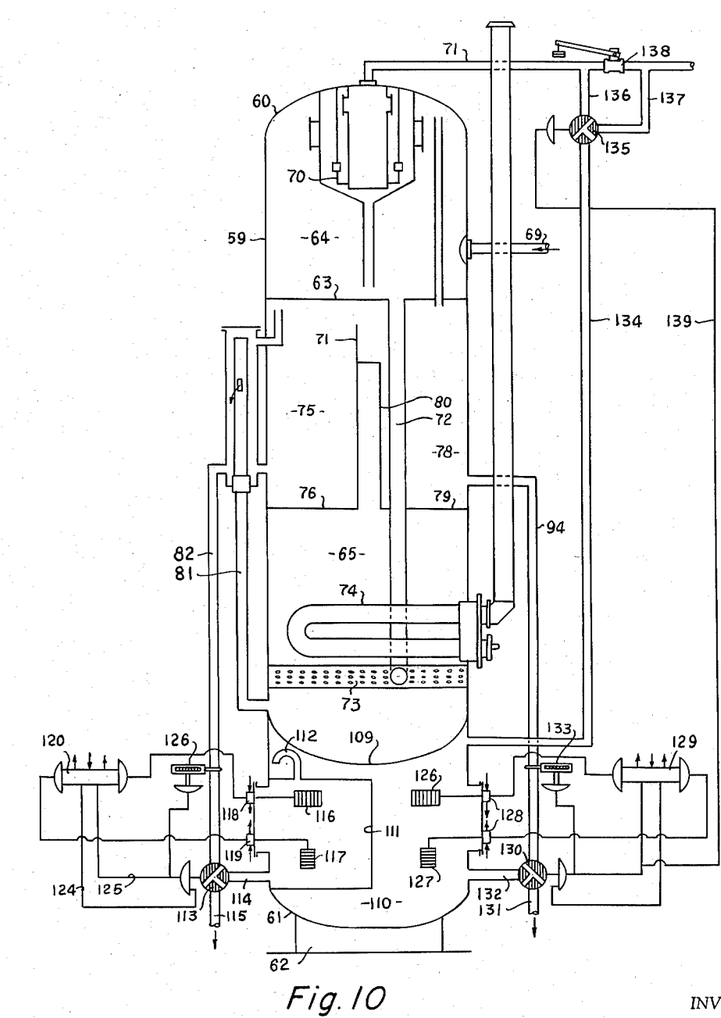
Fig. 10 is a vertical, sectional view of yet another modification of the invention.

Either of the described modifications may also or further be modified as shown in Fig. 10 in which the water metering chamber is covered or enclosed to prevent possible entry of hydrocarbon condensates thereinto, in which two-float metering of the oil and water is carried out, and in which filling of the oil metering chamber is carried out at reduced pressure for greater accuracy of measurement, with automatic increase of this pressure for driving the measured oil from the metering chamber to the storage vessels. Again, the form of the invention show in Fig. 5 is utilized in illustrating the additions of Fig. 10, but it is pointed out that the modifications of the latter form of the invention are equally applicable to either of the first described forms of the invention.

In this further modification of the invention, the upper portion of the structure, or the emulsion-treating section of the metering treater, is substantially identical to that shown in Fig. 5, and the same parts have been designated by the same numerals in Fig. 10. In place of the metering chambers 67 and 68, however, the lowermost partition 109 of the stratification chamber 65 encloses with the bottom 61 of the vesel a single oil-metering chamber 110 having an enclosed water-metering box 111 extending thereinto from one side wall. The box 111 is vented to the chamber 110 through a small inverted U vent pipe 112 through which gas equalization and equalization of pressure between the box and the chamber may occur, but through which condensate from the under side of the head 109 may not flow because of the vent configuration.

Figure 11:
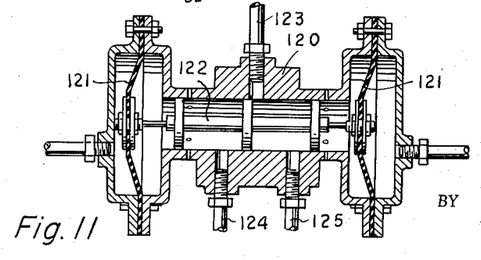
Fig. 11 is a sectional view of the switching valve structure.

Separated water is discharged from the upper portion of the water leg structure 81 through the downwardly-extending pipe 82 to a three-way diaphragm-operated valve 113 having one outlet 114 connected into the water metering box 111 and its second outlet leg 115 leading to a point of water disposal. The valve 113 may be the type which is diaphragm-operated in one direction and spring-operated in the other direction, as described in the preceding modifications of the invention in which single floats are employed in the metering chambers, or for greater accuracy of measurement, the valve 113 may be of the type which is pressure-operated in both directions and accordingly requires a switching valve and a pair of floats operating upper and lower pilot valves. In the modification illustrated in Fig. 10, there is provided within the water metering box 111 upper and lower floats 116 and 117, respectively, operating pilot valves 118 and 119 which, in turn, operate a switching valve 120. The pilot valves are of any suitable or desirable type such as that illustrated in Fig. 7, the switching valve being a diaphragm-operated four-way valve which may be of the type shown in Fig. 11. In this type of valve, there is provided a diaphragm 121 at each end of a valve shaft 122 for shifting the valve shaft lengthwise of the housing of the valve 120 and alternately exposing the pressure or pilot gas supply conductor 123 to a pair of pilot gas outlets 124 and 125 leading to the two sides of the diaphragm of the valve 113. As customary in this type of structure, when the upper float 116 is elevated by filling of the metering chamber 111, the switching valve is shifted in one direction to apply pressure to one side of the diaphragm of the valve 113 and shift the latter valve into position for shutting off the conductor 82 and draining the metering chamber. As the metering chamber 111 drains and the lower float 117 drops, the pilot valve 119 will shift the switching valve 120 in the opposite direction to close off the outlet 115 of the valve 113 and again place the outlet 114 in communication with the pipe 82. The operation is substantially the same as that of the previously described modifications with the exception that the upper and lower floats may be made more sensitive and reponsive to the elevation of the liquid level within the metering chamber so that more exact and accurate measurement is obtained. At the same time, however, the utilization of the two floats and two pilot valves makes necessary the addition of the switching valve 120 for operation of the three-way valve 113 at the proper moments. Of course, the diaphragm-operated counting structure 126 may be connected to either of the pressure conductors 124 or 125 for actuation during each measuring cycle.

The oil-metering chamber 110 is also provided with upper and lower floats 126 and 127 operating pilot valves 128 connected to a switching valve 129 for shifting a three-way valve 130 into position to place the oil outlet conductor 94 or the discharge outlet 131 of the valve 130 alternately in communication with the second discharge outlet 132 of the valve 130 which leads to the chamber 110. Again, a counting unit 133 is provided for recording the fillings and emptyings of the calibrated oil-metering chamber 110, and the operation is otherwise substantially the same as that described for the water-metering chamber.

To insure the operation of the metering chambers at low pressure for accuracy of measurement as well as to supply additional pressure for forcing measured liquids from the metering chambers, both chambers are vented through a pipe 134 and through a three-way valve 135 having its outlets 136 and 137 connected to the gas outlet pipe 71 on both sides of a back pressure valve 138. The back pressure valve will maintain a fixed and predetermined back pressure upon the emulsion-treating portion of the structure, and through the conductor 136 of the valve 135 will maintain this pressure upon the oil metering chamber when the latter is discharging. When the valve 130 is shifted, however, to again commence the filling of the oil metering chamber 110, the valve 135 is shifted through a pilot gas supply conductor 139 to place the vent 134 in communication with the outlet 137 of the valve 135 and correspondingly reduce the pressure within the oil metering chamber to that existing downstream of the back pressure valve 138. This may be a very low pressure or approximately atmospheric pressure whereby the filling of the oil metering chamber 110 and the measuring of the oil therein is carried out at reduced pressure for greater accuracy. Further, the reduction in pressure upon the clean oil will result in the evolution of some dissolved gas therefrom so that the oil is stabilized to a degree and freed of this dissolved gas so as to avoid the flashing of the gas from the clean oil after it enters storage vessels from the metering chamber.

All of the forms of the invention utilize the two-stage condensing of light hydrocarbons which may be evolved from the warm oil, the modification of Fig. 10 making certain that such condensate cannot enter the water metering chamber 111 by dropping thereinto from the relatively cool head 109, and also carrying out a measuring of the clean oil under reduced pressure for greater accuracy and removal of non-condensible gas therefrom.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. The method of resolving an oil well production stream into its oil and water components while stabilizing and metering the separated oil including the steps of, flowing the production stream into a separation zone wherein gas is separated from the stream and the stream is passed over a partition, flowing the production stream from the separation zone to a stratification zone wherein water is separated from the stream, passing the stream in the stratification zone over a source of heat to evolve gaseous fluids from the stream and stabilize the separated oil, withdrawing gas from the stratification and separation zones, withdrawing water from the stratification zone, withdrawing oil from the stratification zone and conducting the withdrawn oil to a metering enclosure and therein metering the stabilized separated oil, and passing vapors evolved in the metering enclosure in heat exchange with the partition over which the production stream is passed in the separation zone to condense hydrocarbon fractions which may be retained in the separated oil under storage conditions so as to enrich the separated oil with light hydrocarbon fractions.

2. A metering emulsion treater including, a vessel, a partition in the vessel forming a gas separation chamber, means for admitting a well stream to the separation chamber and flowing the well stream over the partition, a stratification chamber in the vessel having a vapor space in heat exchange relationship with the partition, means for flowing well stream fluids from the separation chamber over a wall of the vessel, means for heating the well fluids in the vessel subsequently to the passage of the well fluids over the wall of the vessel, water and clean oil outlets from the vessel, a gas outlet from the vessel, a clean oil metering chamber having a vapor space in heat exchange relationship with the wall of the vessel over which the well stream is flowed, means responsive to the liquid level in the oil metering chamber for admitting to and discharging from the oil metering chamber clean oil from the vessel, and means for recording the filling and emptying cycles of the oil metering chamber.

3. A metering emulsion treater as set forth in claim 2, including, a separated water metering chamber, means responsive to the liquid level in the water metering chamber for admitting to and discharging from the water metering chamber water from the vessel, and means for recording the filling and emptying cycles of the water metering chamber.

4. A metering emulsion treater including, a vessel, means for admitting a well stream to the vessel and flowing the well stream over a wall of the vessel, means for heating the well fluids in the vessel subsequently to the passage of the well fluids over the wall of the vessel, the vessel having a stratification space for receiving the heated well fluids, water and clean oil outlets from the vessel, a gas outlet from the vessel, a clean oil metering chamber having a vapor space in heat exchange relationship with the wall of the vessel over which the well stream is flowed, means responsive to the liquid level in the oil metering chamber for admitting to and discharging from the oil metering chamber clean oil from the vessel, and means for recording the filling and emptying cycles of the oil metering chamber.

5. A metering emulsion treater as set forth in claim 4, including, a separated water metering chamber, means responsive to the liquid level in the water metering chamber for admitting to and discharging from the water metering chamber water from the vessel, and means for recording the filling and emptying cycles of the water metering chamber.

6. A metering emulsion treater including, a vessel, means for admitting a well stream to the vessel and flowing the well stream over a wall of the vessel, means for heating fluids in the vessel, the vessel having a stratification space for receiving the heated well fluids, water and clean oil outlets from the vessel, a clean oil metering chamber having a vapor space in heat exchange relationship with the wall of the vessel over which the well stream is flowed, means responsive to the liquid level in the oil metering chamber for admitting to and discharging from the oil metering chamber clean oil from the vessel, a heat exchanger having first and second flow paths in heat exchange relationship, means for passing the well stream through one of said flow paths prior to admission to the vessel, means for passing clean oil through the other of said flow paths between the clean oil outlet and the oil metering chamber, and means for recording the filling and emptying cycles of the oil metering chamber.

7. A metering emulsion treater as set forth in claim 4, including, a separated water metering chamber, means responsive to the liquid level in the water metering chamber for admitting to and discharging from the water metering chamber water from the vessel, a heat exchanger having first and second flow paths in heat exchange relationship, means for passing the well stream through one of said flow paths prior to admission to the vessel, means for passing clean oil through the other of said flow paths between the clean oil outlet and the oil metering chamber, and means for recording the filling and emptying cycles of the water metering chamber.

8. A metering emulsion treater as set forth in claim 4, including a covered water metering box in the oil metering chamber, means responsive to the liquid level in the water metering box for admitting to and discharging from the water metering box water from the vessel, and means for recording the filling and emptying cycles of the water metering box.

9. A metering emulsion treater including, a vessel, means for admitting a well stream to the vessel and flowing the well stream over a wall of the vessel, means for heating fluids in the vessel, the vessel having a stratification space for receiving the heated well fluids, water and clean oil outlets from the vessel, a gas outlet conductor from the vessel, pressure controlling means in the gas outlet conductor, a clean oil metering chamber having a vapor space in heat exchange relationship with the wall of the vessel over which the well stream is flowed, means responsive to the liquid level in the oil metering chamber for admitting to and discharging from the oil metering chamber clean oil from the vessel, means for exposing the metering chamber to the gas outlet conductor downstream of the pressure controlling means when the metering chamber is filling and upstream of the pressure controlling means when the metering chamber is discharging, and means for recording the filling and emptying cycles of the oil metering chamber.

10. A metering emulsion treater including, a vessel, means for admitting a well stream to the vessel, means for heating the well fluids in the vessel, the vessel having a stratification space for receiving the heated well fluids, water and clean oil outlets from the vessel, water and clean oil surge chambers in the stratification space and from which the water and clean oil outlets extend, a gas outlet from the vessel, a clean oil metering chamber, means responsive to the liquid level in the oil metering chamber for admitting to and discharging from the oil metering chamber clean oil from the oil surge chamber, and means for recording the filling and emptying cycles of the oil metering chamber.

11. A metering emulsion treater as set forth in claim 10, including, a separated water metering chamber, means responsive to the liquid level in the water metering chamber for admitting to and discharging from the water metering chamber water from the water surge chamber, and means for recording the filling and emptying cycles of the water metering chamber.

12. A structure for resolving an oil well production stream into its oil and water components including, a vessel, means for admitting a well stream to a vessel, means for heating the well fluids in the vessel, the vessel having a stratification space for receiving the heated well fluids, a water outlet from the vessel, a water-free oil metering chamber, means for conducting water-free oil from the stratification space to the water-free oil metering chamber and including a flow path for the water-free oil, a water-free oil surge chamber in the flow path for the water-free oil and forming a part of the means for conducting water-free oil from the stratification space to the water-free oil metering chamber, means responsive to the liquid level in the oil metering chamber for admitting to and discharging from the oil metering chamber water-free oil from the oil surge chamber, and means for recording the filling and emptying cycles of the oil metering chamber.

13. A metering emulsion treater including, a vessel, means for admitting a well stream to the vessel and flowing the well stream over a wall of the vessel, means for heating the well fluids in the vessel subsequently to the passage of the well fluids over the wall of the vessel, the vessel having a stratification space for receiving the heated well fluids, water and clean oil outlets from the vessel, an oil surge chamber communicating with the clean oil outlet and having a vapor space in heat exchange relationship with the wall of the vessel over which the well stream is flowed, a gas outlet from the vessel, a clean oil metering chamber, means responsive to the liquid level in the oil metering chamber for admitting to and discharging from the oil metering chamber clean oil from the oil surge chamber, and means for recording the filling and emptying cycles of the oil metering chamber.

14. A metering emulsion treater including, a vessel, means for admitting a well stream to the vessel and flowing the well stream over a wall of the vessel, means for heating the well fluids in the vessel, the vessel having a stratification space for receiving the heated well fluids, water and clean oil outlets from the vessel, water and clean oil surge chambers in the upper portion of the stratification space and from which the water and clean oil outlets extend, a gas outlet from the vessel, a clean oil metering chamber having a vapor space in heat exchange relationship with the wall of the vessel over which the well stream is flowed, means responsive to the liquid level in the oil metering chamber for admitting to and discharging from the oil metering chamber clean oil from the oil surge chamber, and means for recording the filling and emptying cycles of the oil metering chamber.

15. A metering emulsion treater including, a vessel, means for admitting a well stream to the vessel and flowing the well stream over a wall of the vessel, means for heating fluids in the vessel, the vessel having a stratification space for receiving the heated well fluids, water and clean oil outlets from the vessel, a clean oil weir box in the stratification space into which clean oil is skimmed, the clean oil outlet extending from the weir box, a water accumulation chamber carried by the vessel, the water outlet extending from the water accumulation chamber, a gas outlet from the vessel, a clean oil metering chamber having a vapor space in heat exchange relationship with the wall of the vessel over which the well stream is flowed, means responsive to the liquid level in the oil metering chamber for admitting to and discharging from the oil metering chamber clean oil from the oil weir box, and means for recording the filling and emptying cycles of the oil metering chamber.

16. A metering emulsion treater including, a vessel, means for admitting a well stream to the vessel and flowing the well stream over a wall of the vessel, means for heating fluids in the vessel, the vessel having a stratification space for receiving the heated well fluids, water and clean oil outlets from the vessel, water and oil surge chambers communicating with the water and clean oil outlets, a gas outlet from the vessel, a clean oil metering chamber having a vapor space in heat exchange relationship with the wall of the vessel over which the well stream is flowed, means responsive to the liquid level in the oil metering chamber for admitting to and discharging from the oil metering chamber clean oil from the oil surge chamber, and means for recording the filling and emptying cycles of the oil metering chamber, a separated water metering chamber, means responsive to the liquid level in the water metering chamber for admitting to and discharging from the water metering chamber water from the water surge chamber, and means for recording the filling and emptying cycles of the water metering chamber.

17. A metering emulsion treater including, a vessel, means for admitting a well stream to the vessel and flowing the well stream over a wall of the vessel, means for heating fluids in the vessel, the vessel having a stratification space for receiving the heated well fluids, water and clean oil outlets from the vessel, a clean oil weir box in the stratification space into which clean oil is skimmed, the clean oil outlet extending from the weir box, a water accumulation chamber carried by the vessel, the water outlet extending from the water accumulation chamber, a gas outlet from the vessel, a clean oil metering chamber having a vapor space in heat exchange relationship with the wall of the vessel over which the well stream is flowed, means responsive to the liquid level in the oil metering chamber for admitting to and discharging from the oil metering chamber clean oil from the oil weir box, and means for recording the filling and emptying cycles of the oil metering chamber, a separated water metering chamber, means responsive to the liquid level in the water metering chamber for admitting to and discharging from the water metering chamber water from the water accumulation chamber, and means for recording the filling and emptying cycles of the water metering chamber.

References Cited in the file of this patent

UNITED STATES PATENTS

| | | |
|---|---|---|
| 2,158,381 | Raymond | May 16, 1939 |
| 2,420,115 | Walker et al. | May 6, 1947 |
| 2,457,959 | Walker et al. | Jan. 4, 1949 |
| 2,664,170 | Walker et al. | Dec. 29, 1953 |
| 2,685,938 | Walker et al. | Aug. 10, 1954 |
| 2,786,543 | Hayes et al. | Mar. 26, 1957 |
| 2,825,423 | Scheirman et al. | Mar. 4, 1958 |
| 2,936,622 | Glasgow | May 17, 1960 |
| 2,940,310 | Henderson | June 14, 1960 |